(12) United States Patent
Shimizu et al.

(10) Patent No.: US 8,435,688 B2
(45) Date of Patent: May 7, 2013

(54) COOLING APPARATUS OF FUEL CELL VEHICLE

(75) Inventors: Masahiro Shimizu, Saitama (JP); Hiroyuki Kikuchi, Saitama (JP); Junya Watanabe, Saitama (JP); Tomoyuki Sahata, Saitama (JP); Jun Morimoto, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 1601 days.

(21) Appl. No.: 11/605,287

(22) Filed: Nov. 29, 2006

(65) Prior Publication Data

US 2007/0122671 A1 May 31, 2007

(30) Foreign Application Priority Data

Nov. 30, 2005 (JP) ................. P.2005-347134

(51) Int. Cl.
*H01M 8/04* (2006.01)

(52) U.S. Cl.
USPC .................. 429/434; 429/442; 429/512

(58) Field of Classification Search ........................ None
See application file for complete search history.

(56) References Cited

U.S. PATENT DOCUMENTS 6,428,444 B1 * 8/2002 Tabata ........................ 477/3

2004/0106027 A1 6/2004 Imaseki et al.
2004/0121205 A1 * 6/2004 Blanchet ..................... 429/26

FOREIGN PATENT DOCUMENTS

| EP | 1251022 A1 | 10/2002 |
| EP | 1710155 A2 | 10/2006 |
| JP | 2001-216986 A | 8/2001 |
| JP | 2002184419 A * | 6/2002 |

* cited by examiner

*Primary Examiner* — Ula C Ruddock
*Assistant Examiner* — Lisa S Park Gehrke
(74) *Attorney, Agent, or Firm* — Birch, Stewart, Kolasch & Birch, LLP

(57) ABSTRACT

A fuel cell two-wheel vehicle is provided with: a fuel cell, fuel tanks, a supercharger, a pipe line, an in-wheel motor, and a motor driver. The fuel cell generates electric power using hydrogen and air as reaction sources. The fuel tanks supply hydrogen to the fuel cell through a hydrogen supply path. The supercharger supplies air from the outside air to the fuel cell. Through the pipe line, an exhaust from the fuel cell is discharged to the outside. The in-wheel motor serves as a driving source of the fuel cell two-wheel vehicle, and the motor driver drives the in-wheel motor. In an air system, a route and an outlet of the pipe line are arranged to be directed toward the motor driver. Thus, a heat sink is exposed to the discharged air having passed through the fuel cell, and thereby the motor driver is cooled.

4 Claims, 14 Drawing Sheets

COOLING APPARATUS OF FUEL CELL VEHICLE

This application claims foreign priority from Japanese Patent Application No. 2005-347134, filed on Nov. 30, 2005, the entire contents of which are hereby incorporated by reference.

BACKGROUND OF THE INVENTION

1. Field of the Invention

The present invention relates to a cooling apparatus of a fuel cell vehicle on which a fuel cell that generates electric power from hydrogen and air is mounted.

2. Related Art

In a fuel cell vehicle, air is sucked by a supercharger through a filter, passed through a humidifier, and supplied to a fuel cell. Humid air discharged from the fuel cell is again passed through the humidifier, in which the humid air is used so as to humidify fresh dry air to be supplied to the fuel cell, and then the humid air is discharged to the outside (see JP-A-2001-216986).

In the fuel cell vehicle disclosed in JP-A-2001-216986, the air having passed through the fuel cell is directly discharged to the outside. However, the air has a potential of use and has been desired to be utilized without being wasted.

SUMMARY OF THE INVENTION

One or more embodiments of the present invention provide a cooling apparatus of a fuel cell vehicle that can effectively use air having passed through a fuel cell.

In accordance with one or more embodiments of the present invention, a cooling apparatus of a fuel cell vehicle is provided with: a fuel cell, a hydrogen supply source, a supercharger, a first air discharge path, a motor, and a drive unit. The fuel cell generates predetermined electric power using hydrogen and air as reaction sources. The hydrogen supply source supplies hydrogen to the fuel cell through the hydrogen supply path. The supercharger supplies air from outside air to the fuel cell. Through the first air exhaust path, an exhaust from the fuel cell is discharged to the outside. The motor serves as a driving source of the fuel cell vehicle, and the drive unit drives the motor. In the cooling apparatus, a route and an outlet of the first air exhaust path are arranged to direct toward the drive unit, and the drive unit is thus cooled with the air discharged from the first air exhaust path.

With such a structure, the air discharged from the first air exhaust path is used for cooling the drive unit, and the drive unit, which generates an intense heat, is thus cooled. Accordingly, the air having passed through the fuel cell can be used to cool the drive unit without being wasted. It is therefore possible to more effectively use the air having passed through the fuel cell.

Further, the hydrogen supply source may be structured by a high pressure hydrogen tank, and hydrogen may be depressurized and supplied to the hydrogen supply paths. In addition, a heat exchanger may be provided in a middle of the first air exhaust path. The heat exchanger may perform heat exchange between air in the first air exhaust path and hydrogen in the hydrogen supply path.

With such a structure, low temperature hydrogen depressurized and supplied from the high-pressure hydrogen tanks can exchange heat with high temperature air in the first air exhaust path. Accordingly, the hydrogen subjected to heat exchange becomes hotter. Then, by supplying the hot hydrogen to the fuel cell, the power generation efficiency of the fuel cell can be improved.

Moreover, the air subjected to heat exchange becomes colder. Then, by cooling the drive unit using the cold air, the efficiency of cooling the drive unit can be improved.

Further, the cooling apparatus may be further provided with: a battery, a second air exhaust path, a temperature detector, a valve, and a controller. The battery supplies electric power to the motor. The second air exhaust path is connected to the first air exhaust path, and air from the fuel cell is supplied toward the battery through the second air exhaust path. The temperature detector detects temperature of the battery. The valve, provided in a middle of the second air exhaust path, adjusts a flow rate of air flowing through the second air exhaust path, and the controller controls the valve. In the cooling apparatus, the controller controls the valve in a case where the temperature of the battery detected by the temperature detector exceeds a predetermined first temperature.

With such a structure, the air in the second air exhaust path is supplied to the battery, and thus the battery, whose temperature has exceeded the predetermined first temperature, is cooled. Accordingly, the air having passed through the fuel cell can be used to cool the battery without being wasted.

Further, in the cooling apparatus, the controller may also control the valve in a case where the temperature of the battery detected by the temperature detector is lower than a predetermined second temperature.

With such a structure, the air in the second air exhaust path is supplied to the battery, and thus the battery, whose temperature is lower than the predetermined second temperature, is warmed. The battery can be thus instantly activated so as to shift from an inactive state to an active state. Accordingly, the air having passed through the fuel cell can be used to activate the battery without being wasted.

Herein, the predetermined first temperature is an upper limit of a temperature range which allows the battery to be normally used. When temperature of the battery exceeds the predetermined first temperature represents, the battery is generating too much heat. The predetermined second temperature is a lower limit of the temperature range which allows the battery to be normally used. When the temperature of the batteries is lower than the predetermined second temperature, the battery may fall into the inactivated state.

According to the embodiments of the present invention, the air having passed through the fuel cell can be effectively used.

Other aspects and advantages of the invention will be apparent from the following description and the appended claims.

DETAILED DESCRIPTION OF THE EXEMPLARY EMBODIMENTS

Figure 1:
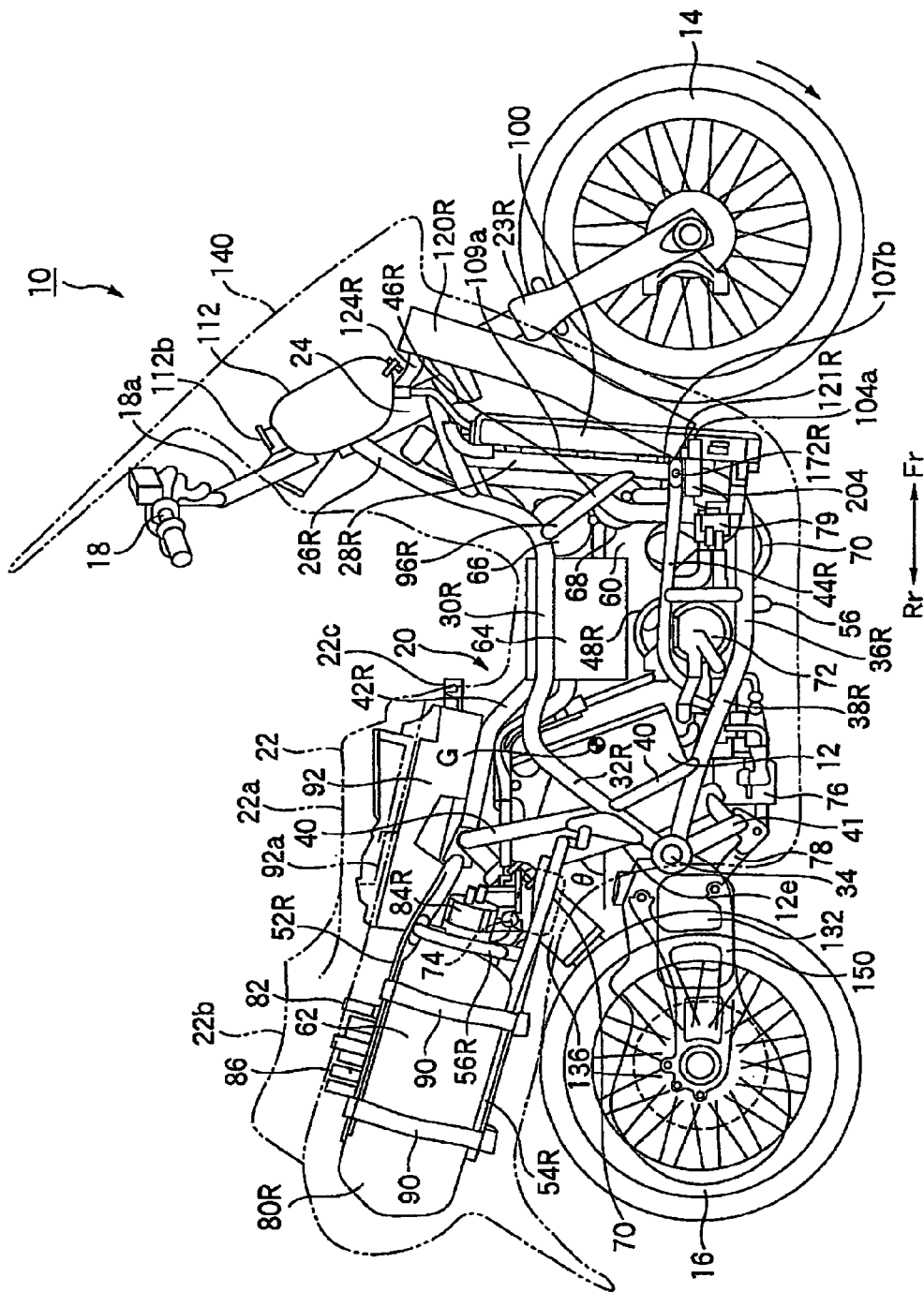
FIG. 1 is a right side view of a fuel cell vehicle.

Hereinafter, a description is given of a cooling apparatus of a fuel cell vehicle according to the present invention using an exemplary embodiment with a reference to the accompanying FIGS. 1 to 14.

A cooling apparatus (an air system 400) according to the exemplary embodiment is mounted on a fuel cell two-wheel vehicle 10 as the fuel cell vehicle. Hereinafter, same components provided on right and left sides in the fuel cell vehicle 10 are differentiated by indicating the right components with reference numeral with "R" and indicating the left components with reference numerals with "L." In the drawings, an arrow "L" indicating the left side and an arrow "R" indicating the right side are shown, and an arrow "Fr" indicating the front side and an arrow "Rr" indicating the rear side are shown.

As shown in FIGS. 1 to 5, the fuel cell two-wheel vehicle 10 is a two-wheel vehicle, which includes a fuel cell 12 mounted thereon, and which runs using electric power obtained from the fuel cell 12. The fuel cell 12 generates electric power by reacting hydrogen gas supplied to an anode electrode with reactive gas (air) supplied to a cathode electrode. In this exemplary embodiment, for the fuel cell 12 a publicly-known one is employed and is not described in detail here. The fuel cell two-wheel vehicle 10 includes a front wheel 14 as a steered wheel, a rear wheel 16 as a drive wheel, and a handle 18 steering the front wheel 14, a frame 20, and a seat 22. The seat 22 is a tandem type and includes a front section 22a and a rear section 22b, which are integrally formed. On the front section 22a, a driver is seated, and on the rear section 22b, a passenger is seated.

In order to effectively use air having passed through the fuel cell 12, the fuel cell two-wheel vehicle 10 includes the air system 400 (see FIGS. 11 to 13) which supplies air used in the fuel cell 12 to a heat sink 135.

Figure 2:
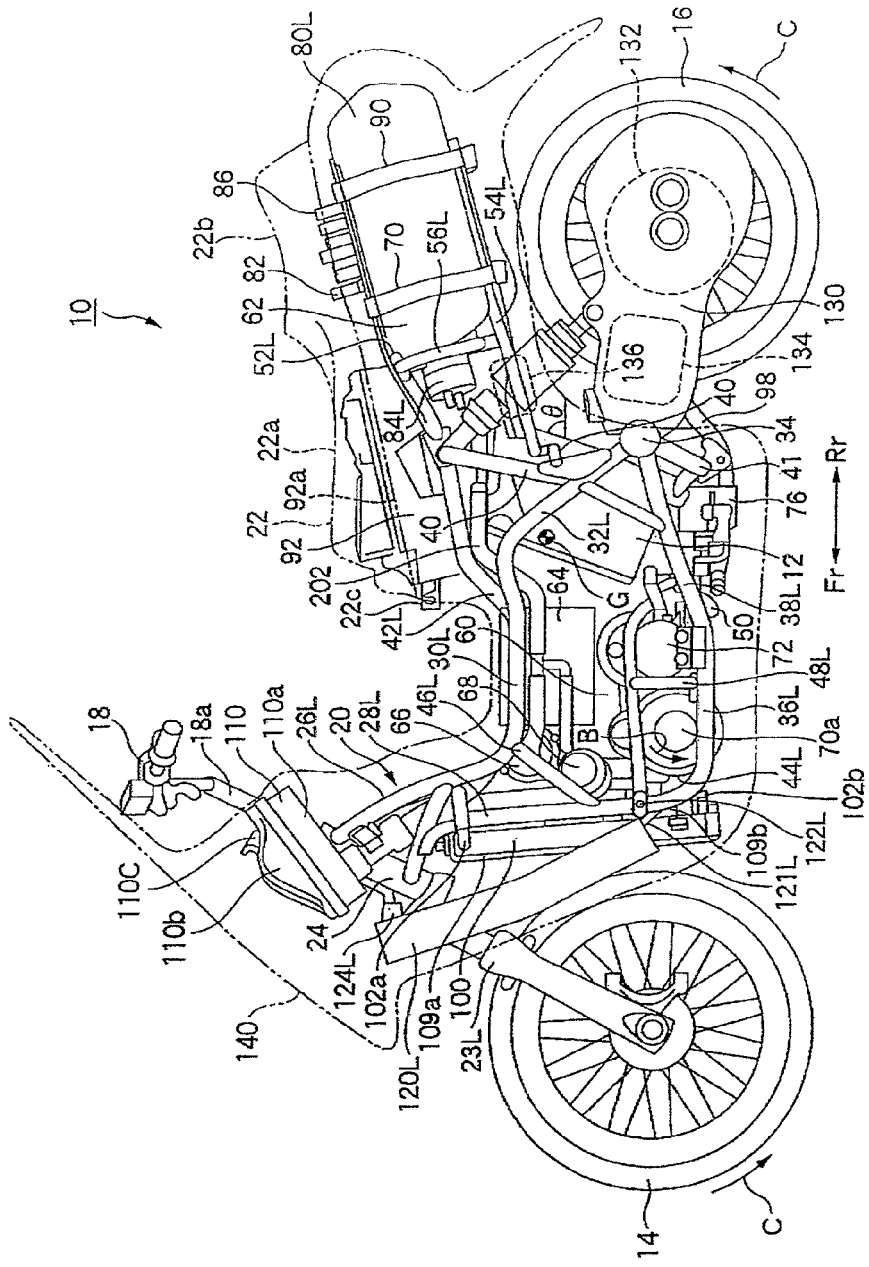
FIG. 2 is a left side view of the fuel cell vehicle.

As shown in FIGS. 1 and 2, the frame 20 includes a head pipe 24, a pair of upper down frames 26L and 26R, and a pair of lower down frames 28L and 28R. The head pipe 24 pivotally supports fork-type front suspensions 23L and 23R in the front part. The upper down frames 26L and 26R are sloped down toward the rear of the vehicle body with the front parts thereof each connected to the head pipe 24. The lower down frames 28L and 28R extend from the head pipe 24 substantially right downward.

The upper down frames 26L and 26R are connected to a pivot 34 respectively through center upper frames 30L and 30R, which are substantially horizontal, and upper pivot frames 32L and 32R, which are sloped down toward the rear. The upper down frame 26L, the center upper frame 30L, and the upper pivot frame 32L are formed of a single pipe bent, and the upper down frame 26R, center upper frame 30R, and the upper pivot frame 32R are formed of a single pipe bent.

The lower down frames 28L and 28R are connected to the pivot 34 respectively through center lower frames 36L and 36R, which are substantially horizontal, and lower pivot frames 38L and 38R, which are smoothly sloped up toward the rear. The lower down frame 28L, the center lower frame 36L, and the lower pivot frame 38L are formed of a single pipe bent, and the lower down frame 28R, the center lower frame 36R, and the lower pivot frame 38R are formed of a single pipe bent.

The frame 20 further includes an upper arch frame 40, a lower arch frame 41, upper sub-frames 42L and 42R, side frames 44L and 44R, front sub-frames 46L and 46R, sub-frames 48L and 48R, and a bottom frame 50. The upper arch frame 40 connects substantially center portions of the lower pivot frames 38L and 38R to each other so as to form an arch shape protruding upward. The lower arch frame 41 connects right and left ends of the pivot 34 to each other so as to form an arch shape slightly protruding downward. The upper sub-frames 42L and 42R respectively connect the center upper frames 30L and 30R to an upper portion of the upper arch frame 40. The side frames 44L and 44R respectively connect portions of the lower down frames 28L and 28R slightly below the centers thereof to the lower pivot frames 38L and 38R. The front sub-frames 46L and 46R respectively connect substantially center portions of the lower down frames 28L and 28R to lower end portions of the upper down frames 26L and 26R. The sub-frames 48L and 48R respectively connect the side frames 44L and 44R to the center lower frames 36L and 36R. The bottom frame 50 connects the center lower frames 36L and 36R to each other under the vehicle.

The upper arch frame 40 is connected to the upper pivot frames 32L and 32R so as to cross the same and diagonally extended backward and upward so as to be tilted backward in a side view. To the lower arch frame 41, not-shown main and side kickstands are attached.

In a bottom view (see FIG. 4), front half portions of the lower pivot frames 38L and 38R are set so as to come closer to each other with the width in-between narrower toward the front and connected to the center lower frames 36L and 36R, respectively. The maximum width between the lower pivot frames 38L and 38R is substantially twice the width between the center lower frames 36L and 36R, which are parallel to each other.

In a top view (see FIG. 3), the maximum width between the center upper frames 30L and 30R is substantially equal to the width between the center lower frames 36L and 36R and is set to such a width that a driver can straddle thereon.

The side frames 44L and 44R protrude outward of the center upper frames 30L and 30R, respectively. The space between the side frame 44L and the center upper frame 30L and the space between the side frame 44R and the center upper frame 30R are set wider than a foot breadth of human, where step plates (footrest sections) 51L and 51R on which the driver put his/her feet are provided. The step plates 51L and 51R are integrally formed with a fairing 140 (see FIG. 1).

The frame 20 further includes a pair of rear upper frames 52L and 52R, which extend from the upper side of the upper arch frame 40 backward and gradually upward; and a pair of rear lower frames 54L and 54R, which extend from substantially middle height portions of the vehicle backward and upward. The rear upper frames 52L and 52R extend substantially linearly. The distance between the rear upper frames 52L and 52R is set slightly wider than the rear wheel 16. The rear lower frames 54L and 54R are substantially parallel to the rear upper frames 52L and 52R in a side view (see FIGS. 1 and 2). In a bottom view (see FIG. 4), the distance between front portions of the rear lower frames 54L and 54R forward of the rear wheel 16 is equal to the distance between the lower pivot frames 38L and 38R, and distance between rear portions of the rear lower frames 54L and 54R backward of the rear wheel 16 is set narrower than the distance between the lower pivot frames 38L and 38R. The wide front part and narrow rear part of the rear lower frames 54L and 54R are connected to each other so that the width in-between gradually shifts. The rear upper frames 52L and 52R and the rear lower frames 54L and 54R are connected to each other through vertical assist frames 56L and 56R, respectively.

According to the thus structured frame 20, a portion substantially surrounded by the upper down frames 26L and 26R, the center upper frames 30L and 30R, the upper sub-frames 42L and 42R, the lower down frames 28L and 28R, the center lower frames 36L and 36R, the lower pivot frames 38L and 38R, and the upper arch frame 40 is a device mount area 60. Moreover, a portion substantially surrounded by the rear upper frames 52L and 52R and the rear lower frames 54L and 54R is a tank support area 62.

In the device mount area 60, provided are the fuel cell 12, a VCU (Voltage Control Unit) 64, a water pump 66, an ion exchanger 68, a supercharger (a supercharger, a pump, or a compressor) 70, a humidifier 72, a heat exchanger 74, a dilution box 76, and a thermostat 79. The VCU 64 performs voltage adjustment. The water pump 66 circulates cooling liquid of the cooling system 200. The ion exchanger 68 removes ions in cooing water to prevent ground fault of the fuel cell 12. The super charger 70 compresses air. The humidifier 72 performs moisture exchange between compressed air supplied to the fuel cell 12 and used air discharged from the fuel cell 12. The heat exchanger 74 performs heat exchange between the used air and pressure-reduced hydrogen to be supplied to the fuel cell 12. The dilution box 76 dilutes purged hydrogen with the used air. The thermostat 79 switches circulation paths of the cooling water when the engine is run up or is excessively cooled down.

The supercharger 70 is provided in side a ventilation channel of a cooling fan 109b (see FIGS. 1 and 2) to promote a cooling effect on the supercharger 70. Similarly, the water pump 66 is provided inside a ventilation channel of a cooling fan 109a to promote a cooling effect on the water pump 66.

The supercharger 70 includes a motor 70a which rotates under an operation of the ECU 92. The rotational direction of the motor 70a is indicated by an arrow B in FIG. 2 and the motor 70a rotates on a plane in a side view. The rotational direction thereof is set to the same direction (the counterclockwise direction in FIG. 2) as rotational directions of the front and rear wheels 14 and 16 (arrows C). With the above setting, a gyroscopic effect caused by rotation of the motor 70a is added to a gyroscopic effect caused by rotation of the front and rear wheels 14 and 16, thus improving running stability. Even when rotational speed of the motor 70a changes, such a moment is not generated that tilts the fuel cell two-wheel vehicle 10 toward right and left. In this case, the rotational direction of the motor 70a may be opposite to the rotational direction of the front and rear wheels 14 and 16.

The fuel cell 12 is provided in a rear portion of the device mount area 60 which is surrounded by the upper pivot frames 32L and 32R on the right and left sides thereof and by the upper arch frame 40. The fuel cell 12 is placed under the seat 22, and specifically placed under the front section 22a, on which the driver is seated.

The VCU 64 has a slightly flat box shape and is provided in an upper center portion of the device mount area 60 which is surrounded by the center upper frames 30L and 30R on the right and left sides thereof. The water pump 66 and the ion exchanger 68 are provided in a portion, which is slightly forward of the VCU 64, and which is surrounded by the front sub-frames 46L and 46R respectively on the right and left sides. The water pump 66 is provided higher than the ion exchanger 68.

Figure 10:
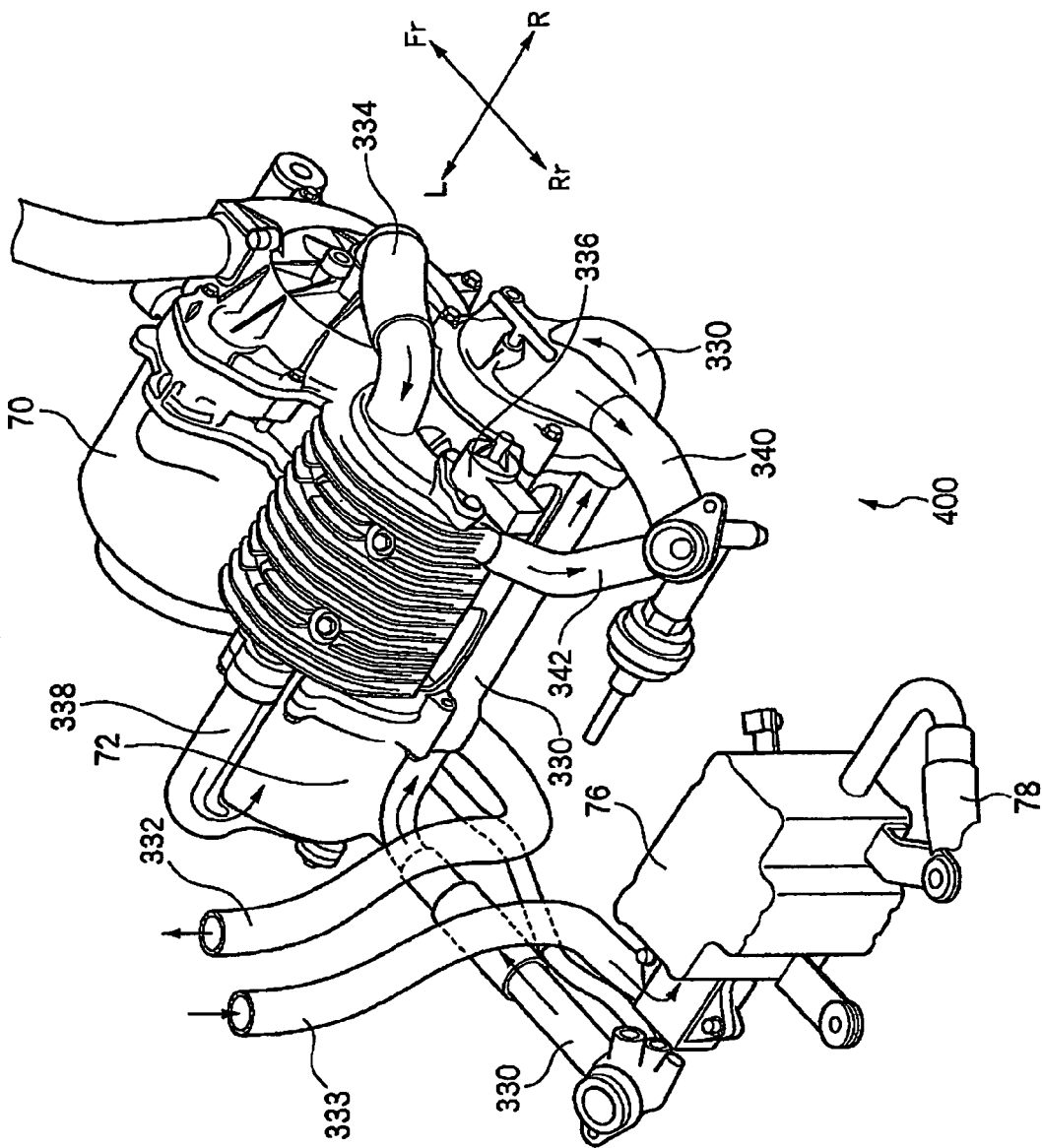
FIG. 10 is a view showing an actual layout of a circuit around a humidifier.

The heat exchanger 74 is provided above and behind the fuel cell 12 (see FIGS. 1 and 2), and used air from the humidifier 72 is introduced through a pipe line 332 to the heat exchanger 74 in the upper portion thereof (see FIG. 10).

The dilution box 76 is provided lower than the fuel cell 12, and the used air from the heat exchanger 74 is introduced through a pipe line 333 to the dilution box 76 below (see FIG. 10).

From the dilution box 76, a pipe line 78 for discharging air used in the fuel cell 12, extends backward. The pipe line 78 is connected to a chamber 150.

In the tank support area 62, provided are a pair of right and left fuel tanks 80L and 80R storing, under high pressure, hydrogen gas to be supplied to the fuel cell 12, a fuel charge port 82, through which hydrogen gas is supplied to the fuel tanks 80L and 80R, in-tank solenoid valves 84L and 84R, which are provided respectively on fuel tanks 80L and 80R, and the pressure regulator unit 86 in the center. The fuel charge port 82 and pressure regulator unit 86 are integrally provided and held in a predetermined space (see FIG. 8).

The fuel tanks 80L and 80R are shaped in a cylinder with hemispherical ends and are provided at positions respectively offset right and left from the center in rearpart of the vehicle body. Specifically, the fuel tanks 80L and 80R are placed so as to extend upward and backward along the seat 22 in the top view (see FIG. 3).

The rear upper frame 52L and the rear lower frame 54L are extended substantially along upper and lower ridge portions of the fuel tank 80L, respectively. The fuel tank 80L is supported by two bands 90 each with both ends thereof fixed to the rear upper frame 52L and the rear lower frame 54L. Similarly, the rear upper frame 52R and the rear lower frame 54R are extended substantially along upper and lower ridge portions of the fuel tank 80R, respectively. The fuel tank 80R is supported by two bands 90 with both ends fixed to the rear upper frame 52R and the rear lower frame 54R.

The fuel tanks 80L and 80R, which are comparatively large parts among parts constituting the fuel cell two-wheel vehicle 10, are provided at positions offset right and left from the centerline and thus hardly overlaps the rear wheel 16 in the top view. It is therefore possible to sufficiently secure vertical suspension stroke of the rear wheel 16. Accordingly, shock from road surface is more likely to be reduced, thus achieving the improvement of ride quality of the fuel cell two-wheel vehicle 10.

Figure 3:
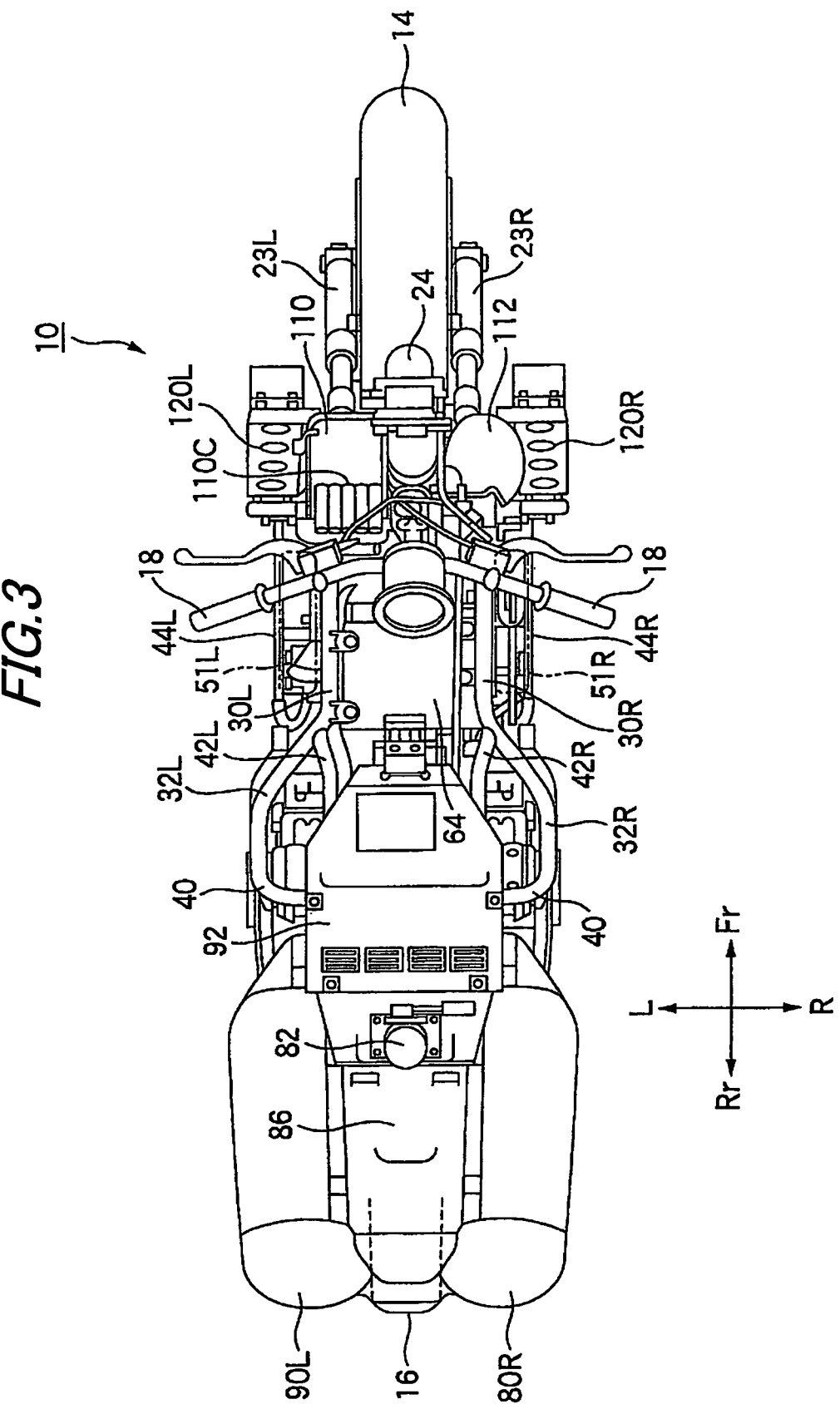
FIG. 3 is a top view of the fuel cell vehicle.

The fuel charge port 82 is provided in the middle position between substantially front end portions of the right and left fuel tanks 80L and 80R under the seat 22 and is directed upward (see FIG. 3). Under the seat 22, the ECU (electric control unit) 92, which performs integral control of the fuel cell two-wheel vehicle 10, is provided. The ECU 92 also controls the fuel cell 12. The fuel charge port 82 and the ECU 92 are placed so that the upper and side faces thereof are covered with the seat 22. When the seat 22 is opened on front hinge 22c, the fuel cell port 82 and ECU 92 are exposed to enable fuel charge and predetermined maintenances. In the upper face of the ECU 92, a recessed portion 92a is formed and can be used as a storage space.

Just in front of the lower down frames 28L and 28R, a radiator 100 for cooling the fuel cell 12 is provided. The radiator 100 has a plate shape with a height substantially twice the width thereof and is provided with both sides being along the lower down frames 28L and 28R. The radiator 100 includes a first tank 102 on a primary side, a second tank 104 on a secondary side, and a cooling section 106. The first tank 102 is supplied with cooling water warmed up by the fuel cell 12 through the water pump 66. The second tank 103 discharges cooling water cooled by releasing heat. The cooling section 106 is provided between the first and second tanks 102 and 104 to perform heat exchange with the outside air. The first tank 102 is provided to the left side of the cooing section 106, and the second tank 104 is provide to the right side of the cooling section 106.

The first and second tanks 102 and 104 have long shapes respectively in the right and left side portions of the radiation 100 along from the upper end to the lower end thereof. In a portion of the second tank 104 slightly above the lower end thereof, a first exhaust port 104a, through which cooling water cooled by releasing heat is discharged, is provided. At the upper ends, a feed port 104c is provided, which is connected to a radiator cap 104b and a reservoir tank 112. The radiator cap 104b operates so as to maintain pressure constant in a system of the cooling system 200 (see FIG. 6): when the pressure increases, a valve inside is opened to escape excess cooing liquid or mixed air to the reservoir tank 112 through the feed port 104c, and when the pressure is low, necessary cooling liquid is supplied from the reservoir tank 112. The reservoir 112 is placed above the radiator cap 104b.

In substantially upper end portion of the first tank 102, an introduction port 102a is provided, through which the warmed cooling water is introduced, in substantially lower end portion thereof, a second exhaust port 102b is provided, which is connected to the thermostat 79.

The cooling section 106 includes a number of narrow tubes to cause the first and second tanks 102 and 104 to communicate with each other and cooling fins having a wave shape in a front view, which are provided between an adjacent pair of these narrow tubes. With the cooling section 106, the cooling liquid passing through the narrow tubes releases heat through the cooling fins to be cooled. Moreover, the cooing fins allow quick ventilation and have large area to provide high cooling effect.

In upper and lower portions of the rear surface of the radiator 100, the cooing fans 109a and 109b are provided, respectively. Air suction operation of these cooing fans 109a and 109b accelerates ventilation of the cooling fins to increase the heat releasing effect of the radiator 100.

Figure 5:
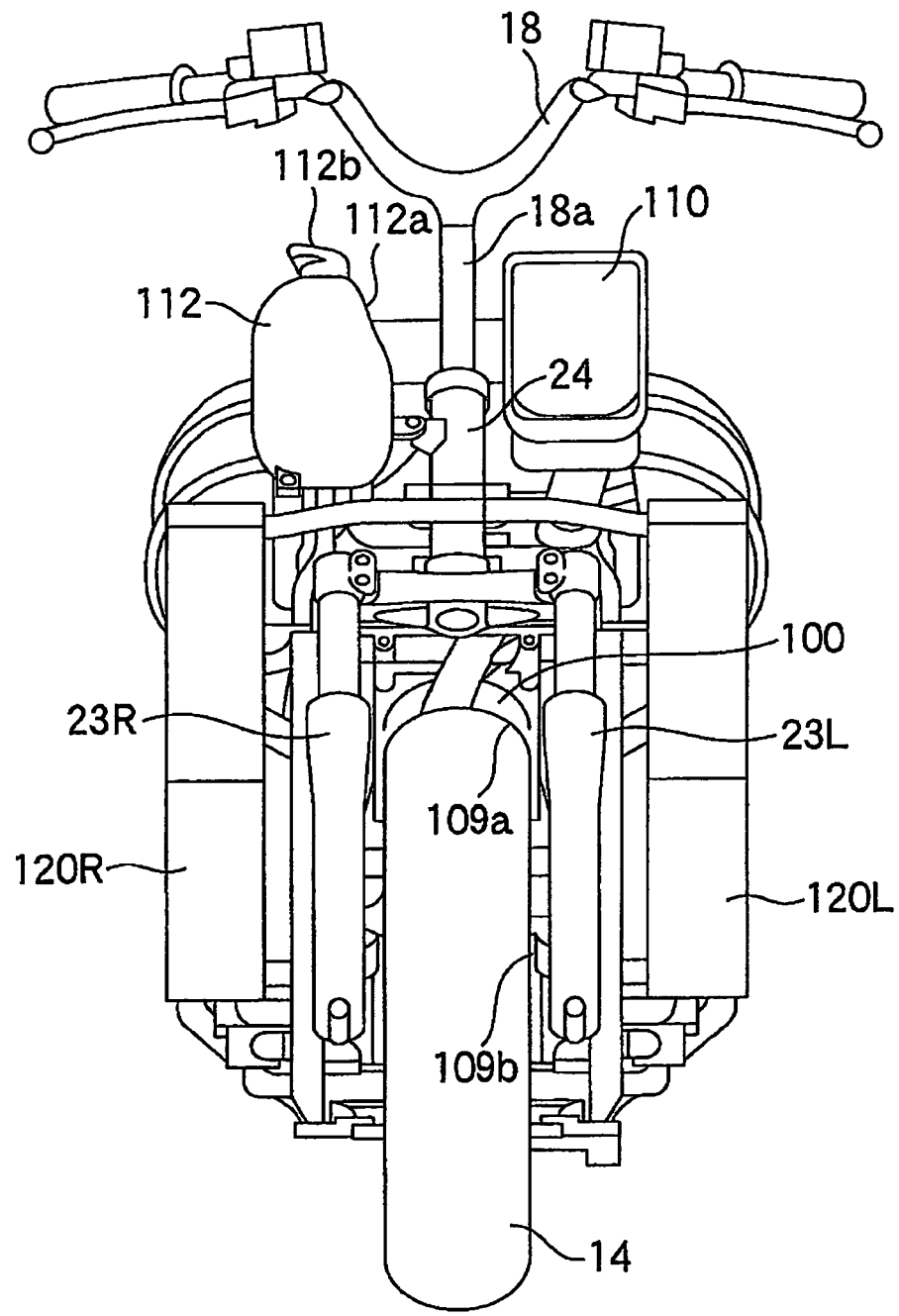
FIG. 5 is a front view of the fuel cell vehicle.

As shown in FIG. 5, to upper portions of the front suspensions 23L and 23R, the handle 18 is connected, with the head pipe 24 interposed therebetween. The handle 18 has a substantially T-shape. To the left of a support shaft 18a with a lower end thereof inserted into the head pipe 24, an air cleaner 110 is provided, which takes the outside air therein, and to the right thereof, a reservoir tank 112, which replenishes the radiator 100 with cooling water, is provided. The air cleaner 110 and the reservoir tank 112 are placed in a balanced manner at substantially symmetric positions with respect to the support shaft 18a and are fixed to a part of the frame 20.

As shown in FIG. 2, the air cleaner 110 includes a square bottom section 110a and a top section 110b covering the top surface of the bottom section 110a and the air cleaner 100 is set so that the bottom surface of the bottom section 110a is directed diagonally downward and backward. The top section 110b bulges in the center thereof, and an air supply port 110c is provided above the bulge. Inside the air cleaner 110, a filter to purify sucked air is provided and can be replaced by detaching the top section 110b.

As shown in FIG. 1, the reservoir tank 112 has a substantially spheroid shape with a recessed portion 112a in a part thereof and is placed so as to be directed upward and slightly backward in a similar manner to the support shaft 18a. The cooling water supply port 112b at the top thereof is directed upward.

As shown in FIGS. 1, 2, and 5, between the front wheel 14 and the lower down frames 28L and 28R, a pair of secondary batteries 120L and 120R are provided outside of the radiator 100. Each of the secondary batteries 120L and 120R has a substantially rectangular column shape vertically long and are gently curved in the middle so as to slightly protrude forward.

Moreover, the secondary batteries 120L and 120R are placed so as to diagonally extend forward from vicinities of the front ends of the side frames 44L and 44R, respectively. Lower end portions of the secondary batteries 120L and 120R are connected to the lower down frames 28L and 28R with stays 122L and 122R, respectively, and upper end portions thereof are connected to the head pipe 24 with stays 124L and 124R, respectively. The secondary batteries 120L and 120R have a same function and share power half and half in both charging and discharging.

Figure 11:
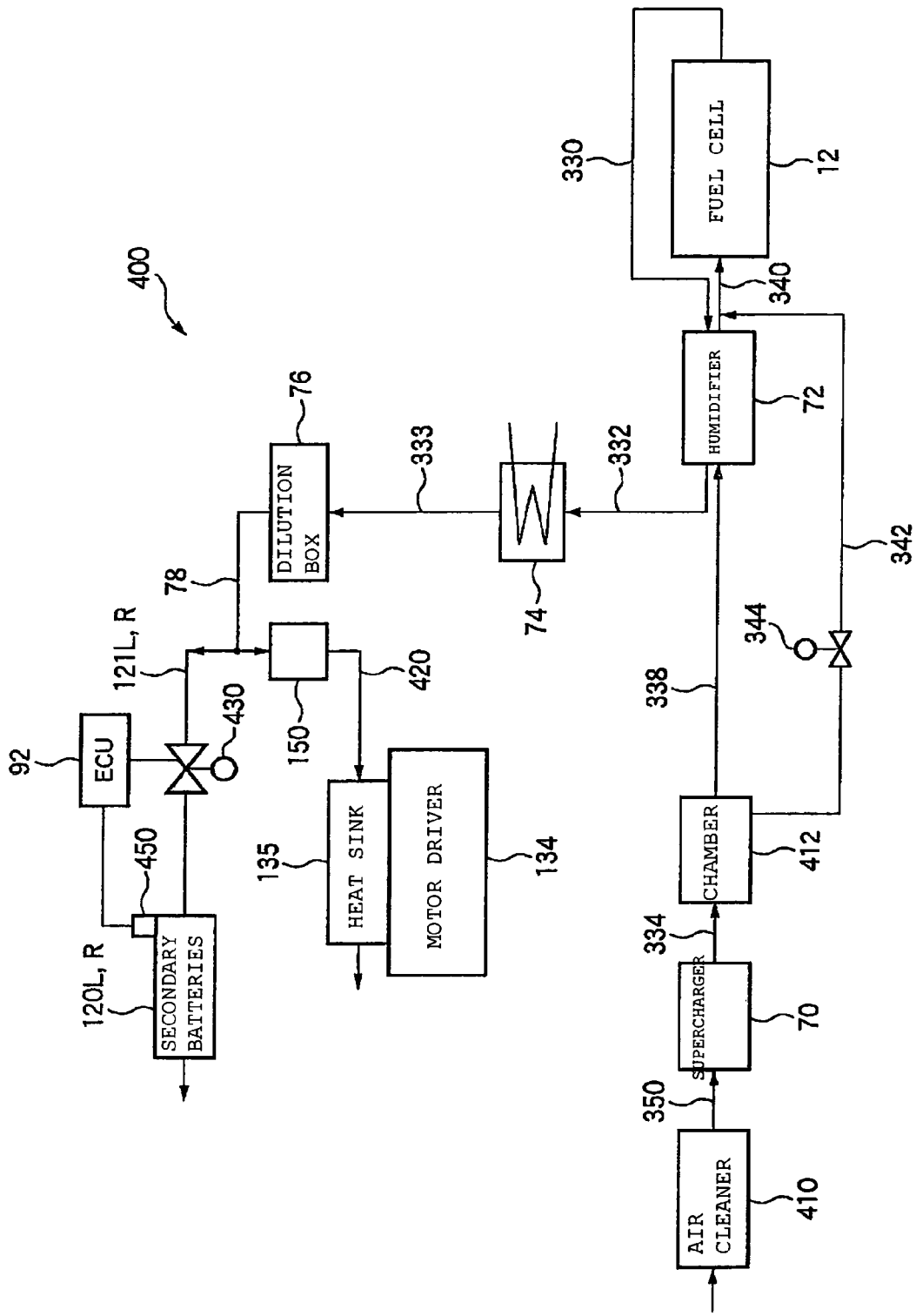
FIG. 11 is a block diagram of an air system.

To the secondary batteries 120L and 120R, thermistors 450 are provided, which detect temperatures inside the batteries (see FIG. 11). The thermistors 450 are electrically connected to the ECU 92, and temperatures detected by the thermistors 450 are outputted to the ECU 92.

To rear lower end portions of the secondary batteries 120L and 120R, pipe lines 121L and 121R branching from a pipe line 78, through which air used in the fuel cell 12 is discharged, are connected, respectively.

The front wheel 14 is rotatably supported on a shaft on lower end portions of the front suspensions 23L and 23R. The rear wheel 16 is supported on a swing arm 130, which can be rotated around the pivot 34. To the left of the rear wheel 16, an in-wheel motor 12 and a motor driver 134, which drives the in-wheel motor 132, are provided. The motor driver 134 is in adjacent to the heat sink 135 to maintain the temperature of the motor driver 134 at a proper temperature of 25 to 60° C. Between an upper part of the upper arch frame 40 and an upper part of the left side of the swing arm 130, a rear suspension 136 is provided. The heat sink 135 is connected to a pipe line 420 and is an air-cooling type which is cooled by air having been used in the fuel cell 12 and passed the pipe line 78 and chamber 150.

The cooling apparatus in the fuel cell two-wheel vehicle 10 according to the present exemplary embodiment includes: the fuel cell 12, the fuel tanks 80L and 80R, the supercharger 70, the pipe line 420, the motor 70a and the motor driver 134. The fuel 12 generates predetermined electric power using hydrogen and air as reaction sources. The fuel tanks 80L and 80R as hydrogen supply sources which supply hydrogen to the fuel cell through the supply pipes 312L and 312R as hydrogen supply paths, respectively. The supercharger 70 supplies air from the outside air to the fuel cell 12. The pipe line 420 as a first air exhaust path which allows air from the fuel cell 12 to be discharged to the outside. The motor 70a serves as a driving source of the fuel cell two-wheel vehicle 10, and the motor driver 134 as a drive unit drives the motor. The cooling apparatus is characterized in that the pipe line 420 and the outlet thereof are placed to be directed toward the motor driver 134 so as to cool the motor driver 134 with the discharged air.

The cooling apparatus is further characterized in that each of the fuel tanks 80L and 80R is composed of a high-pressure hydrogen tank. Hydrogen is depressurized and supplied to the supply pipes 312L and 312R. In the middle of the pipe line 420, the heat exchanger 74 is provided. The heat exchanger performs heat exchange between air in the pipe line 420 and hydrogen gas in the supply pipes 312L and 312R.

Moreover, the cooling apparatus further includes: the secondary batteries 120L and 120R, the pipe line 121L and 121R, the thermistors 450, the solenoid valves 430 and the ECU 92. The secondary batteries 120L and 120R supply power to the motor 70a. The pipe lines 121L and 121R as second air exhaust paths allow air from the fuel cell 12 to be supplied to the secondary batteries 120L and 120R. The thermistors 450 as temperature detecting means detect the temperatures of the secondary batteries 120L and 120R The solenoid valves 430 as valves are provided, respectively, in the middle of the pipe lines 121L and 121R and adjust the flow rate of air flowing through the pipe lines 121L and 121R, respectively. The ECU 92 as a controller controls the solenoid valves 430. The cooling apparatus is characterized in that the ECU 92 controls the solenoid valves 430 in a case where the temperatures of the secondary batteries 120L and 120R detected by the thermistors 450 become higher than a predetermined first temperature T1.

The cooling apparatus is characterized in that the ECU controls the solenoid valves 430 in a case where the temperatures of the secondary batteries 120L and 120R detected by the thermistors 450, respectively, become lower than a predetermined second temperature T0.

As is apparent from FIGS. 1 and 2, the front part of the seat 22 has a shape recessed down to a large extent, and the fuel cell two-wheel vehicle 10 is therefore classified into a scooter-type two-wheel vehicle. The substantially entire body of the fuel cell two-wheel vehicle 10 is covered with the fairing 140 as indicated by a virtual line in FIGS. 1 and 2.

In the fuel cell two-wheel vehicle 10 as described above, electric power is supplied from the secondary batteries 120L and 120R to the in-wheel motor 132, a predetermined heater, and the like at the start thereof for warming up the engine. After the engine is warmed up, electric power generated in the fuel cell 12 is supplied to the in-wheel motor 132, thus enabling running.

Moreover, when the rate of an increase in required output is comparatively small in such a case where throttle opening is increased, the outputs of the secondary batteries 120L and 120R are superposed on the output of the fuel cell 12 and supplied to the wheel motor 132, thus obtaining high response. When the amount of required output is larger, the outputs of the secondary batteries 120L and 120R are additionally supplied, and moreover the output of the fuel cell 12 is increased to improve the capability of following the throttle opening.

Figure 6:
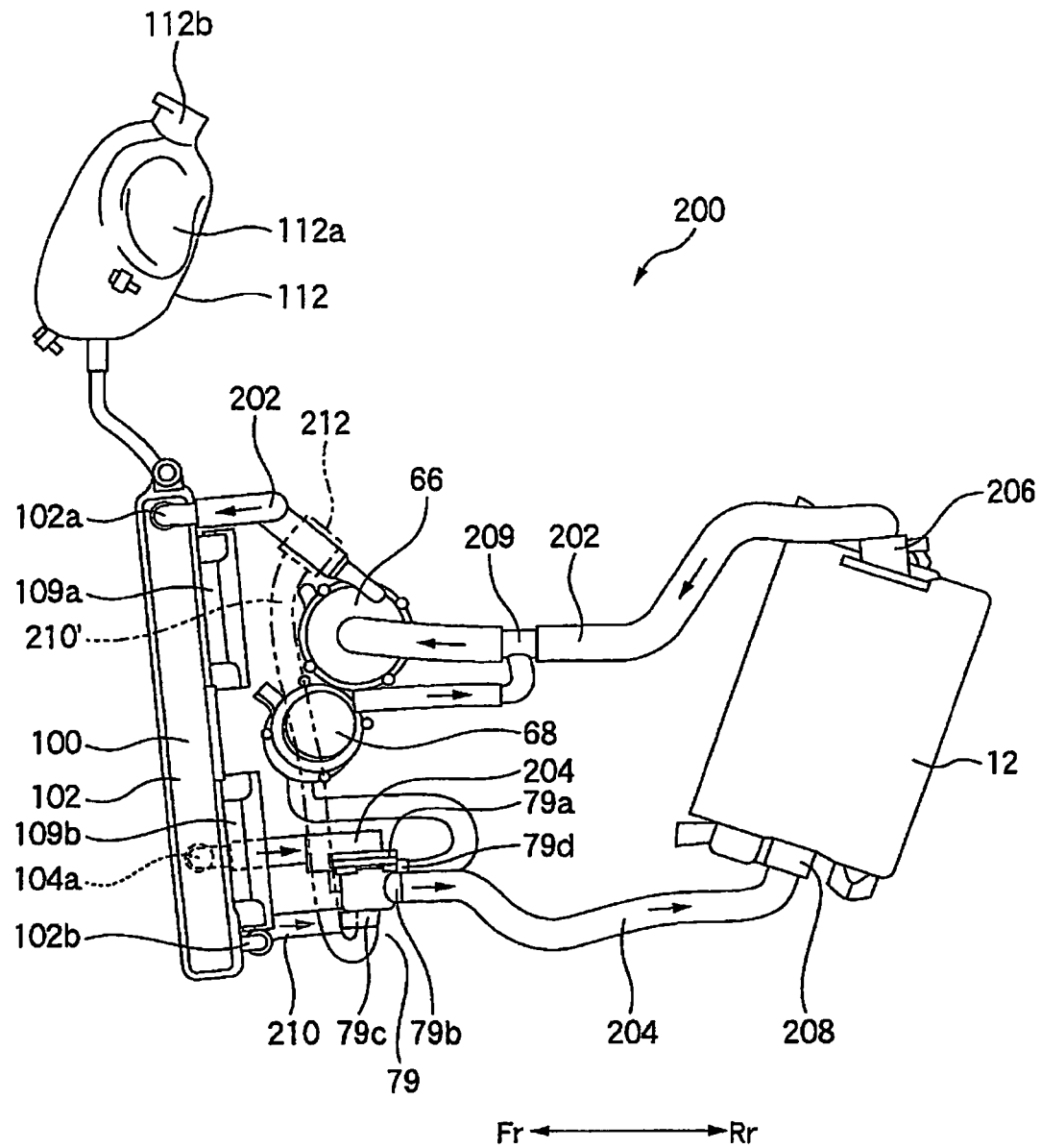
FIG. 6 is a view showing an actual layout of a circuit of a cooling system.
Figure 7:
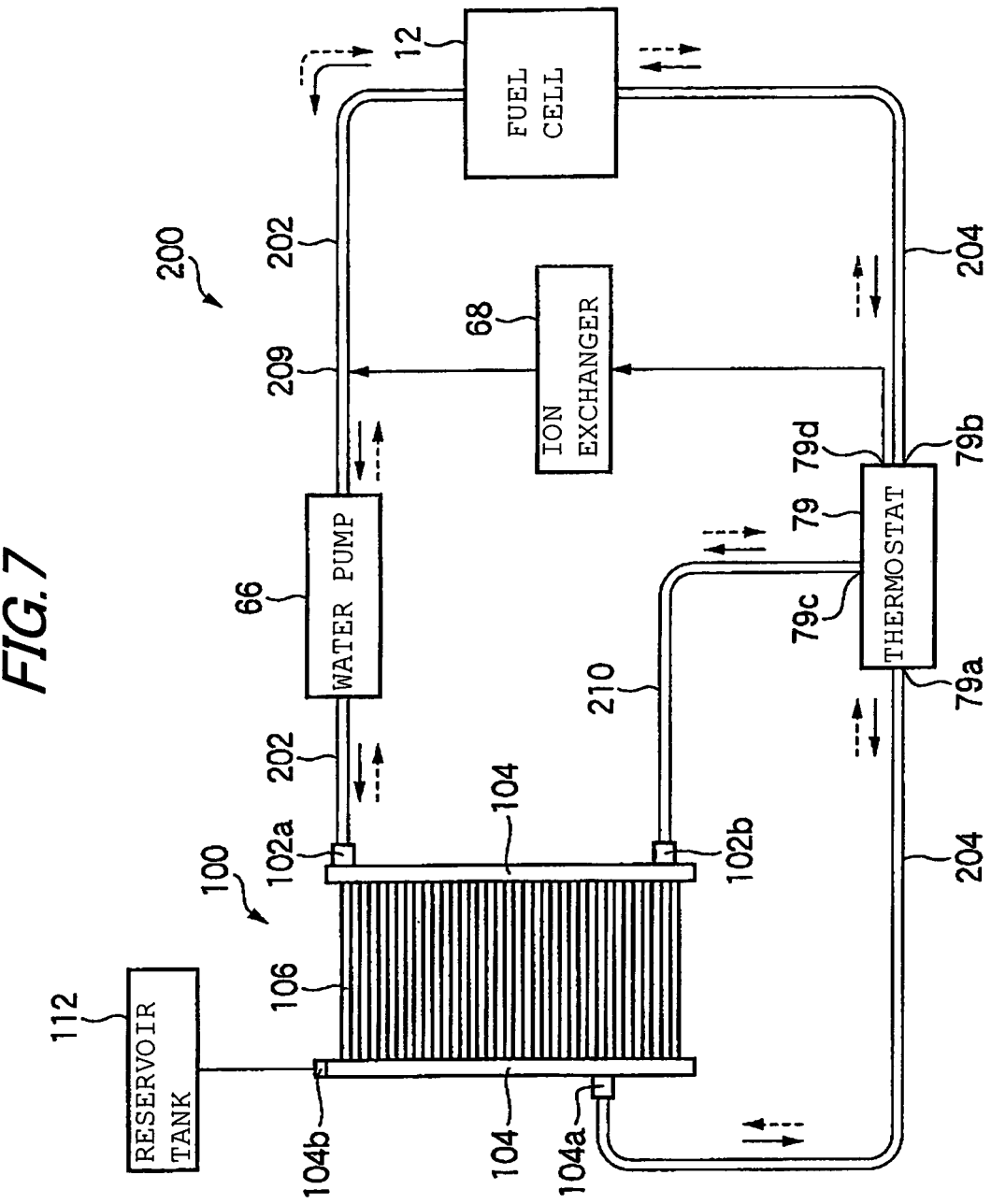
FIG. 7 is a block diagram of the cooling system.

Next, with reference to FIGS. 6 and 7, a description is given of a water-cooling type cooling system 200 which cools the fuel cell 12 to maintain the temperature thereof at a proper range.

As shown in FIGS. 6 and 7, the cooling system 200 includes the water pump 66, the ion exchanger 68, the thermostat 79, the radiator 100, and the reservoir tank 112. The cooling system 200 basically supplies cooling water warmed in the fuel cell 12 as a heat source through a first main pipe line 202 to the radiator 100, in which the cooling water releases heat to be cooled. The cooling system 200 then supplies the cooling water to the fuel cell 12 through a second main pipe line 204, circulating the cooling water in this manner. The water pump 66 is provided in the middle of the first main pipe line 202 to drive and circulate the cooling water.

An end of the first main pipe line 202 is connected to the top surface of the fuel cell 12 with an upper joint 206 interposed therebetween, and an end of the second main pipe line 204 is connected to the bottom surface of the fuel cell 12 with a lower joint 208 interposed therebetween. With such a connection manner of the first and second main pipe lines 202 and 204, the cooling liquid is introduced through the second main pipe line 204 to the fuel cell 12, cools a power generation cell inside the same to be warmed, and is then led out through the first main pipe line 202, thus circulating the cooling liquid under an operation of the water pump 66.

Moreover, since the end of the first main pipe line 202 is connected to the top surface of the fuel cell 12, air interfused into the fuel cell 12 goes above, and is smoothly discharged to the first main pipeline 202, and thus the air can be effectively taken out of the fuel cell 12. This can suppress reduction in the power generation efficiency of the fuel cell 12. Air discharged to the first main pipe line 202 is discharged to the reservoir tank 112 through the radiator cap 104b.

Moreover, since the end of the second main pipe line 204 is connected to the bottom surface of the fuel cell 12. Even in a case where air is interfused into the second main pipe line 204, air is discharged through the fuel cell 12 to the first main pipe line 202.

Furthermore, the first and second main pipe lines 202 and 204 are provided in outer portions of the upper and bottom surfaces of the fuel cell 12 in the width direction of the vehicle, which secures room in a front portion or a rear portion of the fuel cell 12. Accordingly, the placement of the first and second main pipe lines 202 and 204 does not affect the layout of other devices. For this reason, in front of the fuel cell 12, the VCU 64 can be arranged.

The thermostat 79 is provided in the middle of the second main pipe 204. The thermostat 79 includes four ports 79a, 79b, 79c, and 79d. Among these, the ports 79a and 79b are connected to the second main pipe line 204 and normally communicate with each other so as to supply the cooling water cooled by the radiator 100 to the fuel cell 12. The port 79c is connected to the first tank 102 and the second exhaust port 102b with a bypass pipe line 210 interposed therebetween. The second exhaust port 102b is connected to the first main pipe line 202 with the first tank 102 and introduction port 102a interposed therebetween, and moreover, there is no component serving as a throttle or a valve in these communication portions. Accordingly, the cooling system 200 is equivalent to a circuit in which the port 79c directly communicates with the first main pipe line 202. Moreover, the cooling system 200 is configured such that part of cooing water passes through the ion exchanger 68 from the port 79d and is discharged to the first main pipe line 202 through a joint 209 to be circulated.

The thermostat 79 has a function to switch the communication paths depending on temperature of the cooling liquid. While the engine is warmed up, the port 79a is shut off while simultaneously the port 79c is opened, so that the ports 79c and 79d communicate with each other. Cooling water discharged from the water pump 66 passes through the introduction port 102a, first tank 102, second exhaust port 102b, and bypass pipe line 210 to be introduced to the thermostat 79 through the port 79a and then returned to the fuel cell 12 through the port 79b. While the engine is warmed up, cooling water is therefore circulated without passing through the cooing section 106 and is not cooled unnecessarily. Accordingly, the temperature of the fuel cell 12 can be quickly increased to a proper temperature.

Figure 4:
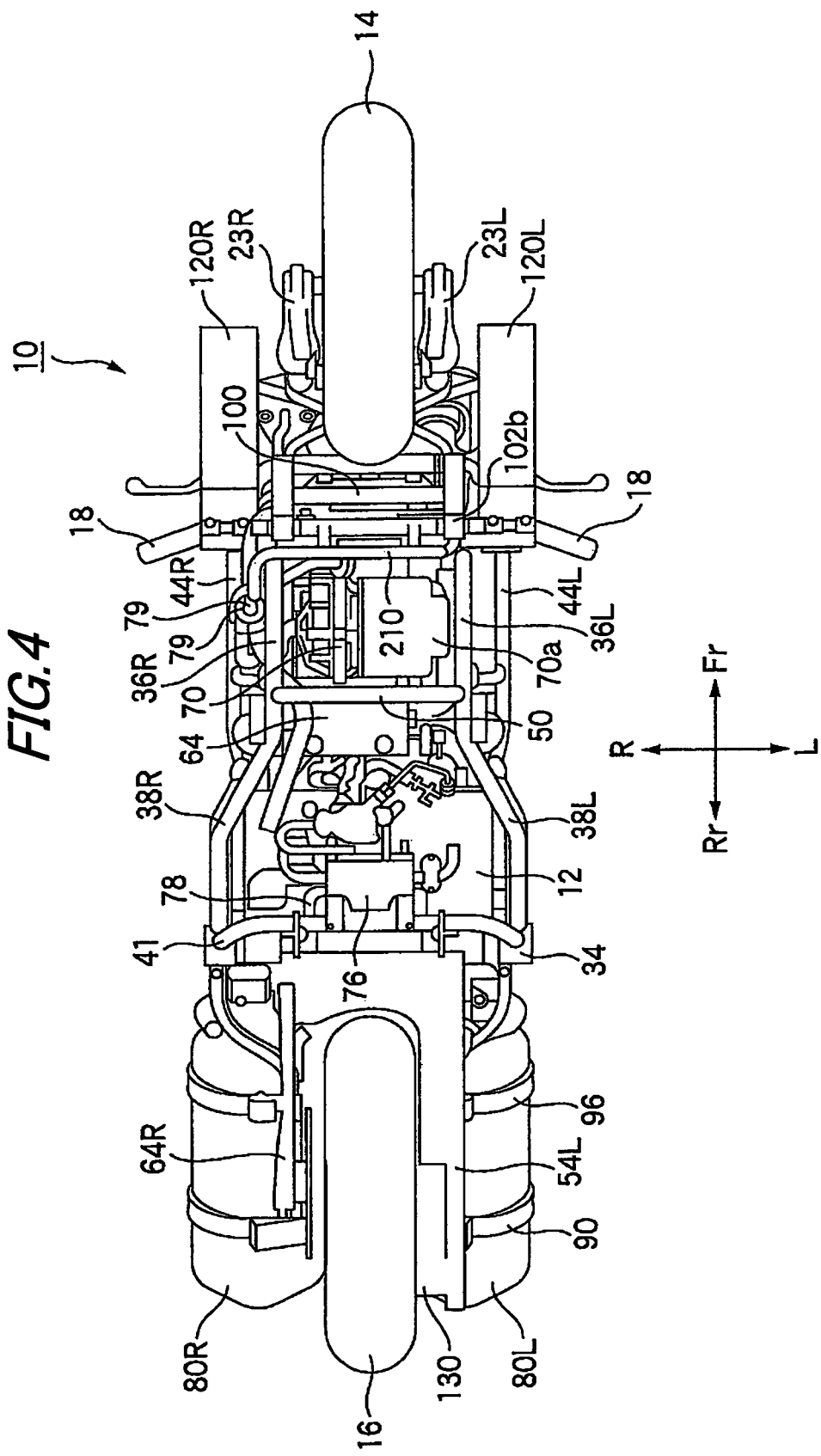
FIG. 4 is a bottom view of the fuel cell vehicle.

As described above, connecting the first tank 102 to the thermostat 79 with the bypass pipe line 210 interposed therebetween means that the thermostat 79 is connected to the first main pipe line 202 in the circuit. In other words, the first tank 102 serves as a part of a flow path of the first main pipe line 202, and the bypass pipe line 210 can be set as a short pipe line to the first tank 102. This can facilitate an arrangement of the pipe lines and increase the flexibility of the layout of the constituent parts. Specifically, as shown in FIG. 4, the bypass pipe line 210 is placed along the bottom surface of the vehicle body, and the length thereof is set shorter.

If the bypass pipe line 210 is not connected to the first tank 102, as indicated by the virtual line of FIG. 6, it is necessary to provide a branch joint 212 for the first main pipe line 202 and to provide a bypass pipe line 210' so as to be vertically long and cross from side to side, which limits the layout of the supercharger 70, ion exchanger 68, and water pump 66. On the other hand, the present exemplary embodiment does not have such a disadvantage since the bypass pipe line 210 is connected to a lower portion of the first tank 102.

The first tank 102 has a shape vertically long, and the first main pipe line 202 and bypass pipe line 210 are connected to opposite portions of the first tank 102 with respect to the center thereof in the direction along the longer side thereof. Accordingly, the length of the first tank 102 is effectively utilized, and the first main pipe line 202 and the bypass pipe line 210 are placed apart from each other to secure room therebetween, thus further increasing the flexibility of the layout.

The switching valve connected to the first tank 102 with the bypass pipe line 210 interposed therebetween is not limited to one performing the switching operation in response to the temperature of the cooling liquid like the manner of the thermostat 79 and may be, for example, one switching based on a timer operation or a result of predetermined calculating operation.

The direction of circulation of the cooling liquid in the cooling system 200 may be reversed as indicated by a dash line of FIG. 7. Specifically, the cooling liquid warmed up in the fuel cell 12 may be introduced into the thermostat 79 through the port 79b and led out through either one of the first and second exhaust ports 104a or 102b (in this case, the both individually serve as an introduction port) by means of the switching operation thereof to release heat in the radiator 100, in other words, to bypass the cooling section 106 to be supplied to the water pump 66 through the introduction port 102a (in this case, the introduction port 102a serves as an outlet port). By reversely operating the water pump 66, the cooling water is returned to the fuel cell 12 through the first main pipe line 202. In such a manner, even when the direction of circulation of the cooling water is reversed, the path communicating the bypass pipe line 210 with the first main pipeline 202 through the first tank 102 is formed. Accordingly, similar to the above description, there is an effect that the arrangement of the pipe lines is facilitated and the flexibility of the layout of the constituent parts is increased.

In the cooling system 200, the heat source as an object to be cooled by the radiator 100 is not limited to the fuel cell 12 and may be an internal combustion engine, a motor, or the like.

Figure 8:
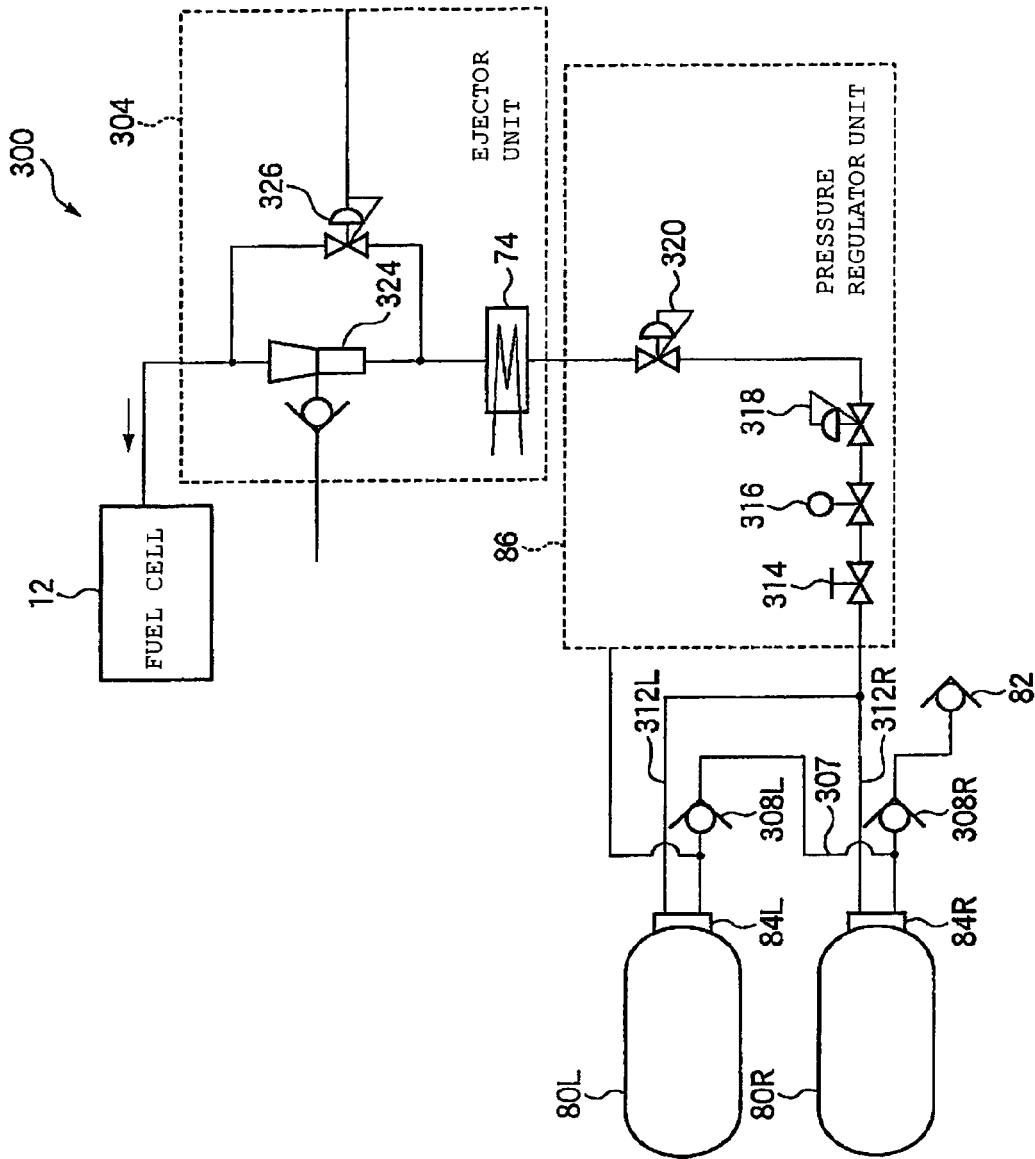
FIG. 8 is a block diagram of a hydrogen system.
Figure 9:
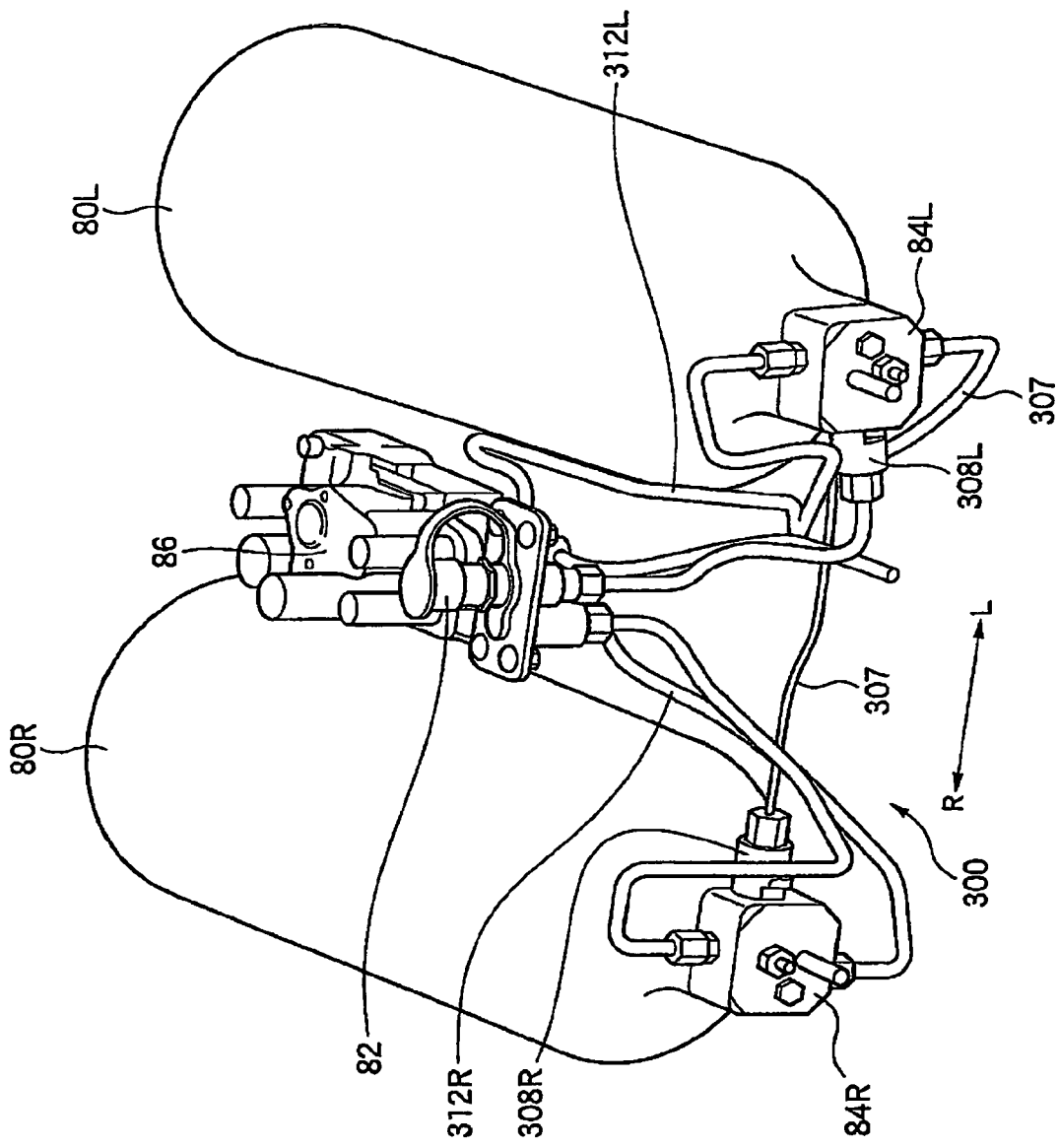
FIG. 9 is a view showing an actual layout of a circuit around fuel tanks.

Next, a description is given of a hydrogen system 300 for supplying hydrogen gas for cooling the fuel cell 12 with reference to FIG. 8.

As shown in FIG. 8, the hydrogen system 300 includes the fuel charge port 82, the fuel tanks 80L and 80R as hydrogen supply sources, a pressure regulator unit 86, and an injector unit 304 and the hydrogen system 300 supplies hydrogen gas to the fuel cell 12.

As shown in FIG. 8, the fuel tank 80R is charged with hydrogen gas at high pressure from the fuel charge port 82 through a check valve 308R and the in-tank magnetic valve 84R. The fuel tank 80L is charged with hydrogen gas at high pressure from a pipe line 307, which branches from the secondary side of the check valve 308R through a check valve 308L and the in-tank magnetic valve 84L.

Hydrogen gas is supplied from the fuel tanks 80L and 80R through supply pipes 312L and 312R and joined together on the way to be supplied to the pressure regulator unit 86.

The pressure regulator unit 86 includes, starting from the upstream side, a manual valve 314, an electromagnetic shutoff valve 316, a first regulator 318, and a second regulator 320 connected in series in a circuit. The manual valve 314 is a main valve for the fuel tanks 80L and 80R and the manual valve 314 is usually opened. The electromagnetic shutoff valve 316 is opened and closed according to whether or not the fuel cell two-wheel vehicle 10 is driven. The first regulator 318 reduces pressure of high-pressure hydrogen gas to a predetermined level. The second regulator 320 regulates pressure to be supplied to an ejector unit 304 according to the driving condition.

The ejector unit 304 includes: the heat exchanger 74, which heats low-temperature hydrogen gas supplied from the pressure regulator unit 86 by performing heat exchange thereon with air used in the fuel cell 12; and an ejector 324 and a differential pressure regulator 326, which are placed the downstream side of the heat exchanger 74 in parallel to each other. The secondary side of the ejector 324 and differential pressure regulator 326 is connected to the fuel cell 12, and the fuel cell 12 is supplied with hydrogen gas whose pressure is regulated to the predetermined level by the differential pressure regulator 326. Unreacted wet hydrogen gas having passed through a gas-liquid separator is supplied to the ejector 324 and sucked by the suction operation thereof to be again led into the fuel cell 12, thus forming a circulation path in this manner.

Figure 12:
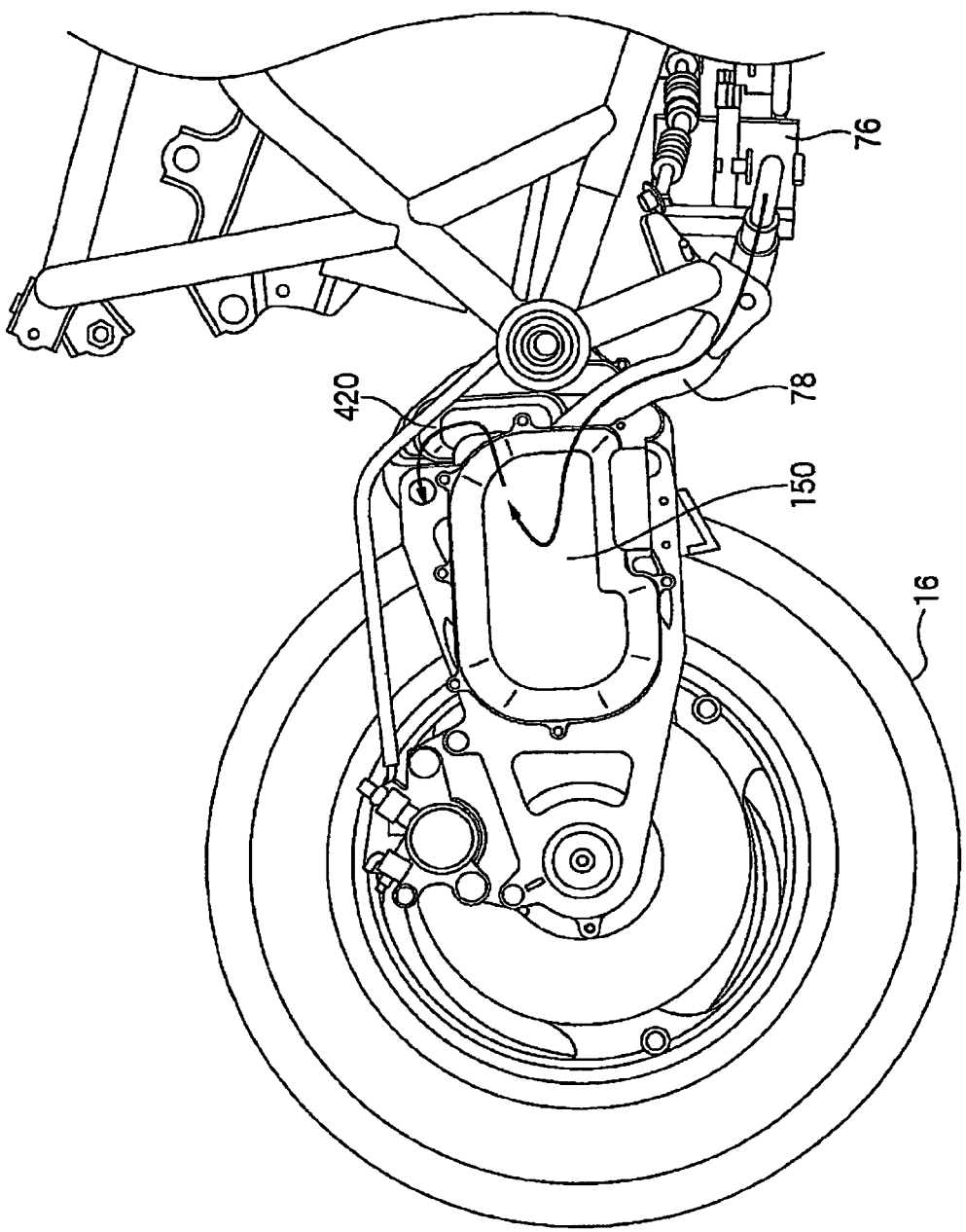
FIG. 12 is an actual layout view showing a circuit near the right side of a rear wheel.
Figure 13:
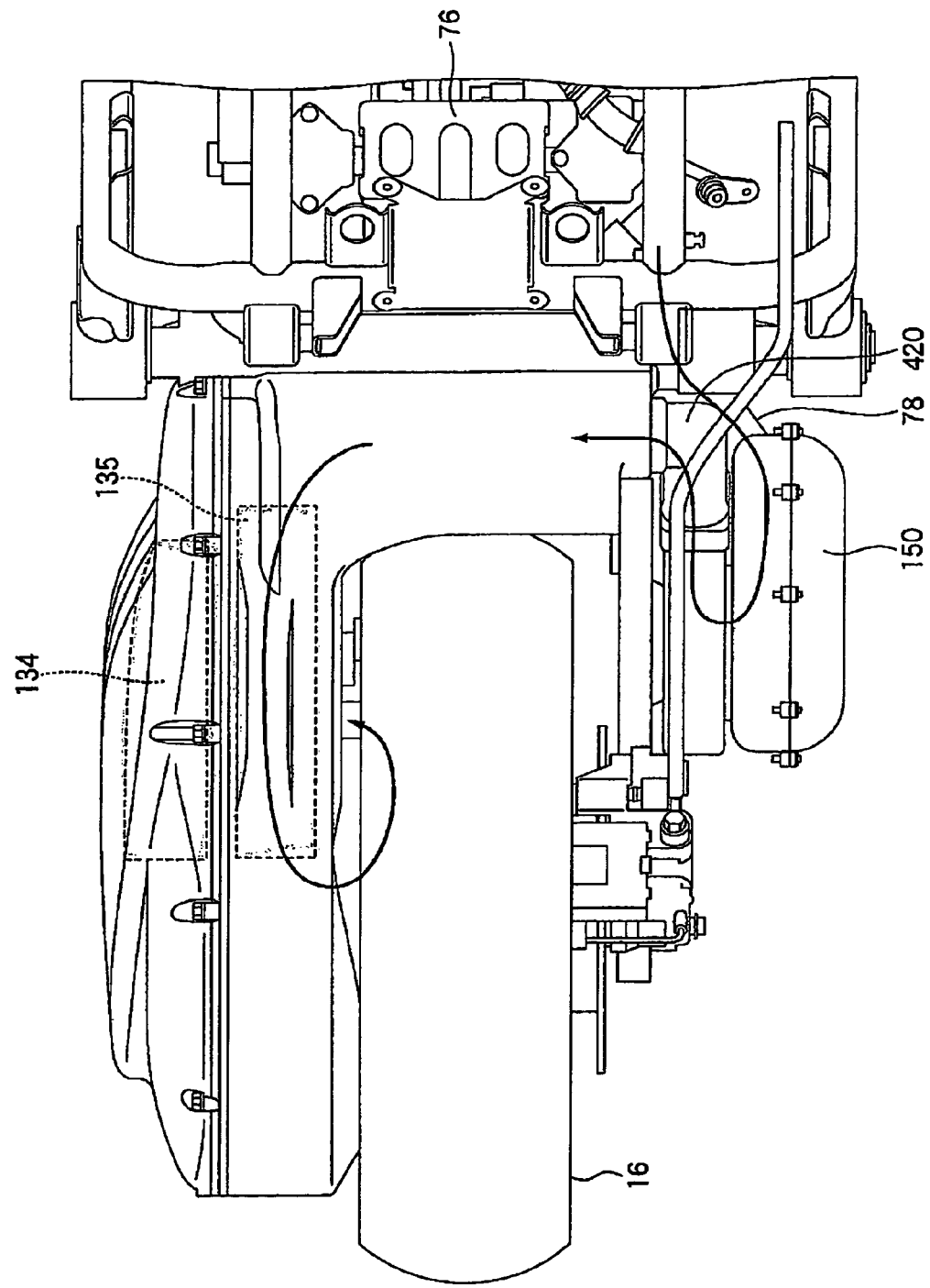
FIG. 13 is a view showing an actual layout of a circuit around the rear wheel.

Next, a description is given of an air system 400 to supply and discharge air to and from the fuel cell 12 with reference to FIGS. 11 to 13.

As shown in FIG. 11, the air system 400 includes an air cleaner 410, the supercharger 70, a chamber 412, the humidifier 72, the heat-exchanger 74, and the dilution box 76 and the air system 400 supplies air to the fuel cell 12 and discharges air (saturated water vapor, nitrogen, and water) from the fuel cell 12.

As shown in FIGS. 11 to 13, air is taken in the air system 400 from the outside air through the air cleaner 410 and fed to the supercharger 70 through the pipe line 350. The air is pressurized into high temperature gas in the supercharger 70 and fed into the chamber 412 through the pipe line 334.

In normal driving, the air fed to the chamber 412 is introduced to the humidifier 72 through the pipe line 338 to exchange moisture with air discharged from the fuel cell 12 as off gas, thus being humidified and the air is then supplied to the fuel cell 12 through the pipe line 340. In the start at low temperature, the flow rate of air passing through the humidifier 72 is controlled by a bypass valve 344, and high-temperature air is supplied to the fuel cell 12. The pipe lines 340 and 342 are joined to each other and connected to a supply joint of the fuel cell 12.

Air used for reaction in the fuel cell 12 becomes wet and high-temperature off gas containing unreacted oxygen gas and is introduced to the humidifier 72 through the pipe line 330. After releasing moisture thereof to air to be supplied to the fuel cell 12 in the humidifier 72, the air as the off gas is introduced to the heat exchanger 74 through the pipe line 332 and exchanges heat with low-temperature hydrogen gas supplied from the pressure regulator unit 86 to be cooled.

The air cooled by heat exchange in the heat exchanger 74 is supplied to the dilution box 76 through the pipe line 333. In the dilution box 76, purged hydrogen is diluted and discharged to the pipe line 78.

The pipe line 78 is extended to the rear wheel 16 side and connected to the chamber 15, which is placed at the right side of the rear wheel 16. In the middle of the pipe line 78, the pipe lines 121L and 121R are provided by branching from the pipe line 78, which are drawn respectively to the secondary batteries 120L and 120R, respectively.

The air fed from the pipe line 78 to the chamber 150 passes through a pipe line 420, which extends from the chamber 150 on the right side of the fuel cell two-wheel vehicle 10 to the vicinity of the motor driver 134 as a drive unit on the left side thereof, and the air is supplied to a heat sink 135, which adheres to the motor driver 134. The supplied air cools the heat sink 135 with vapor thereof and latent heat of vaporization of water. In other words, the pipe line 420 and the outlet thereof are placed so as to feed air to the heat sink 135, which adheres to the motor driver 134. The air supplied to the heat sink 135 is discharged from a center portion of the rear wheel 16 to the atmosphere.

On the other hand, the air branching from the pipe line 78 and is sent to the pipe lines 121L and 121R, is supplied to the secondary batteries 120L and 120R through the solenoid valves 430. Thermistors 450 are provided respectively in the secondary batteries 120L and 120R to detect the battery temperature. The battery temperature detected by the thermistors 450 are outputted to the ECU 92. The ECU 92 controls the solenoid valves 430 according to the detected battery temperature and thus adjusts the flow rates of air flowing through the pipe lines 121L and 121, respectively.

Figure 14:
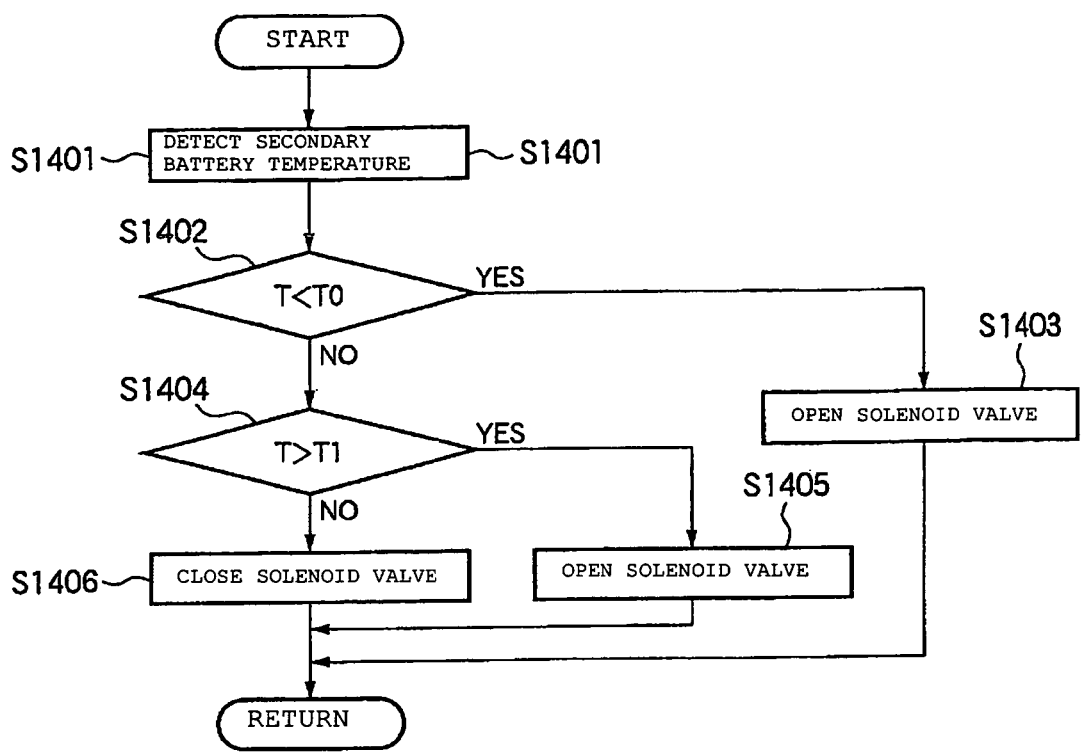
FIG. 14 is a flowchart showing a control to feed air to secondary batteries.

Specifically, as shown in FIG. 14, in S1401, the ECU 92 detects the battery temperature. In S1402, in a case where the ECU 92 judges at the start that the battery temperature T detected by the thermistors 450 become excessively low temperature, which is lower than temperature T0 (T<T0), in step S1403, the ECU 92 opens the solenoid valves 430 to supply air from the pipe lines 121L and 121R to the secondary batteries 120L and 120R and to warm the secondary batteries 120L and 120R, respectively.

Moreover, after judging that the battery temperature T is higher than the temperature T0 (not TT0), in a case where the ECU 92 judges that the battery temperature T detected by the thermistors 450 become excessively high temperature, which is higher than temperature T1 (TT1), in S1404, the ECU 92 opens the solenoid valves 430 to supply air used in the fuel cell 12 and cooled in the heat exchanger 74 respectively from the pipe lines 121L and 121R to the corresponding secondary batteries 120L and 120R and cool the secondary batteries 120L and 120R, respectively, in step S1405.

After judging that the temperature T of the batteries is lower than the temperature T1 (not T>T1) in the S1404, the ECU 92 closes the solenoid valves 430 in step S1406 not to supply air respectively from the pipe lines 121L and 121R to the corresponding batteries 120L and 120R.

As described above, in this exemplary embodiment, the outlet of the pipe line 420 is placed in adjacent to the motor driver 134 so as to supply air to the heat sink 135. Air discharged from the pipe line 420 is used to cool the motor driver 134, and the motor driver 134 generating high temperature is thus cooled. Air having passed through the fuel cell 12 can be therefore used to cool the motor driver 134 without being wasted. Accordingly, the air having passed the fuel cell 12 can be more effectively used.

Moreover, the heat exchanger 74 is provided, which performs heat exchange between the air having passed through the fuel cell 12 and hydrogen gas, and low-temperature hydrogen gas which is depressurized and supplied from the fuel tanks 80L and 80R can exchange heat with high-temperature air having passed the fuel cell 12. Accordingly, the temperature of the hydrogen gas subjected to heat exchange becomes higher, and supplying the heated hydrogen gas to the fuel cell 12 can increase the power generation efficiency of the fuel cell 12.

Moreover, the temperature of the air subjected to heat exchange becomes lower, and cooling the motor driver 134 using the cold air can increase the cooling efficiency of the motor driver 134.

In a case where the temperatures T of the secondary batteries 120L and 120R detected respectively by the thermistors 450 exceed T1, the ECU 92 controls the solenoid valves 430 so that the amount of air flowing through the pipe lines 121L and 121R becomes larger. The air in the pipe lines 121L and 121R is supplied to the secondary batteries 120L and 120R, and the secondary batteries 120L and 120R whose temperatures exceed the temperature T1 are cooled. Accordingly, the air having passed through the fuel cell 12 can be used to cool the secondary batteries 120L and 120R without being wasted.

Also in a case where the temperature T of the secondary batteries 120L and 120R detected respectively by the thermistors 450 is lower than the temperature T0, the ECU 92 controls the solenoid valves 430 so that the amount of air flowing through the pipe lines 121L and 121R becomes larger. The air in the pipe lines 121L and 121R is thus supplied, respectively, to the secondary batteries 120L and 120R, and the secondary batteries 120L and 120R whose temperature is lower than the temperature T0 are warmed. The secondary batteries 120L and 120R can be therefore instantly activated so as to shift from an inactive state to an active state. Accordingly, the air having passed through the fuel cell 12 can be used to activate the secondary batteries 120L and 120R without being wasted.

It is obvious that the cooling system of a fuel cell vehicle according to the present invention is not limited to the aforementioned exemplary embodiment and can employ various configurations without departing from the scope of the invention. Moreover, it is obvious that, in terms of the fuel cell system, the cooling apparatus can be applied to a system of an arbitrary structure and can cool heat generation sources of various drive units, and moreover, various modifications can be made to the cooling mechanism thereof.

What is claimed is:

1. A cooling apparatus of a fuel cell vehicle, the cooling apparatus comprising:
   a fuel cell;
   a hydrogen supply source that supplies hydrogen to the fuel cell through a hydrogen supply path;
   a supercharger that supplies air to the fuel cell;
   a motor as a driving source of the fuel cell vehicle; and
   a motor driver which drives the motor;
   a heat sink mounted adjacent to the motor driver;
   a first air exhaust path extending between the fuel cell and the heat sink so that exhaust entering the first air exhaust path from the fuel cell cools the motor driver and is discharged to an outside of the heat sink;
   a battery that supplies electric power to the motor;
   a second air exhaust path with a first end branching from a central portion of the first air exhaust path and a second end adjacent to the battery;
   a temperature detector that detects temperature of the battery;
   a valve provided in a middle of the second air exhaust path; and
   a controller programmed to open the valve in the second air exhaust path when the temperature of the battery detected by the temperature detector is higher than a first temperature so that a flow rate of the exhaust flowing from the fuel cell to the battery becomes larger.

2. The cooling apparatus according to claim 1, wherein the hydrogen supply source comprises a high pressure hydrogen tank,
   hydrogen is depressurized and supplied to the hydrogen supply path, and a heat exchanger is provided in the first air exhaust path in a position between the fuel cell and a point where the first end of the second air exhaust path branches from the first air exhaust path, wherein the heat exchanger exchanges heat between the exhaust in the first air exhaust path and the hydrogen in the hydrogen supply paths.

3. The cooling apparatus according to claim 1, wherein the controller is configured to open the valve when the temperature of the battery detected by the temperature detector is lower than a second temperature, wherein the second temperature is lower than the first temperature.

4. The cooling apparatus according to claim 1, further comprising a humidifier, a heat exchanger, and a dilution box located at positions in the first air exhaust path between the fuel cell and a point where the first end of the second air exhaust path branches from the first air exhaust path.

* * * * *